July 15, 1958   K. BOFINGER ET AL   2,843,248
APPARATUS FOR TREATING ARTICLES
Filed Feb. 6, 1956   4 Sheets-Sheet 1

INVENTORS
KARL BOFINGER
RONALD E. J. NORDQUIST
BY
ATTORNEYS

INVENTORS
KARL BOFINGER
RONALD E. J. NORDQUIST
BY Charles H. Erne
Leland R. McCann
George W. Reifer
ATTORNEYS July 15, 1958     K. BOFINGER ET AL     2,843,248
APPARATUS FOR TREATING ARTICLES
Filed Feb. 6, 1956     4 Sheets-Sheet 4

INVENTORS
KARL BOFINGER
RONALD E. J. NORDQUIST
BY
ATTORNEYS

United States Patent Office 2,843,248
Patented July 15, 1958

2,843,248

APPARATUS FOR TREATING ARTICLES

Karl Bofinger, Cincinnati, Ohio, and Ronald E. J. Nordquist, Summit, N. J., assignors to American Can Company, New York, N. Y., a corporation of New Jersey Application February 6, 1956, Serial No. 563,621

13 Claims. (Cl. 198—19)

The present invention relates to an apparatus for treating articles, preferably sheet metal can body blanks and the like and has particular reference to mechanism for conveying and reversing the position of the articles for treatment of opposed portions thereof.

This application is a companion to the following applications filed in the United States Patent Office: Serial Number 563,578, filed February 6, 1956, in the name of Harold R. Vitense, on Apparatus for Treating Articles; application Serial Number 563,626, filed February 6, 1956, in the names of Karl Bofinger and Bert A. Deisch, on Apparatus for Treating Articles; application Serial Number 563,576, filed February 6, 1956, in the names of Harold R. Vitense and Walter F. Pillnik, on Apparatus for Treating Edge Portions of Can Body Blanks, and Serial Number 563,577, filed February 6, 1956, in the name of Harold R. Vitense, on Method of Treating Edge Portions of Blanks.

An object of the instant invention is the provision of an apparatus for treating articles wherein opposed portions of the articles may be treated individually while the articles are conveyed along a continuous path of travel designed to occupy a minimum floor space with a maximum efficiency.

Another object is the provision of such an apparatus in which the articles may be advanced while held in a suspended position and in which the articles are reversed in position during their advancement so as to present opposed portions of the articles for individual treatment.

Another object is the provision in such an apparatus of novel transfer devices for effecting the reversal of the articles during their travel through the apparatus.

Numerous other objects and advantages of the invention will be apparent as it is better understood from the following description, which, taken in connection with the accompanying drawings, discloses a preferred embodiment thereof.

Referring to the drawings.

As a preferred or exemplary embodiment of the instant invention the drawings illustrate principal parts of an apparatus or machine for subjecting opposed marginal edge portions A, B (Fig. 3) of flat sheet metal can body blanks C to a treatment such as deoxidizing, washing, electroplating, drying or other desired treatment while the blanks are conveyed along a substantially continuous path of travel.

Figure 3:
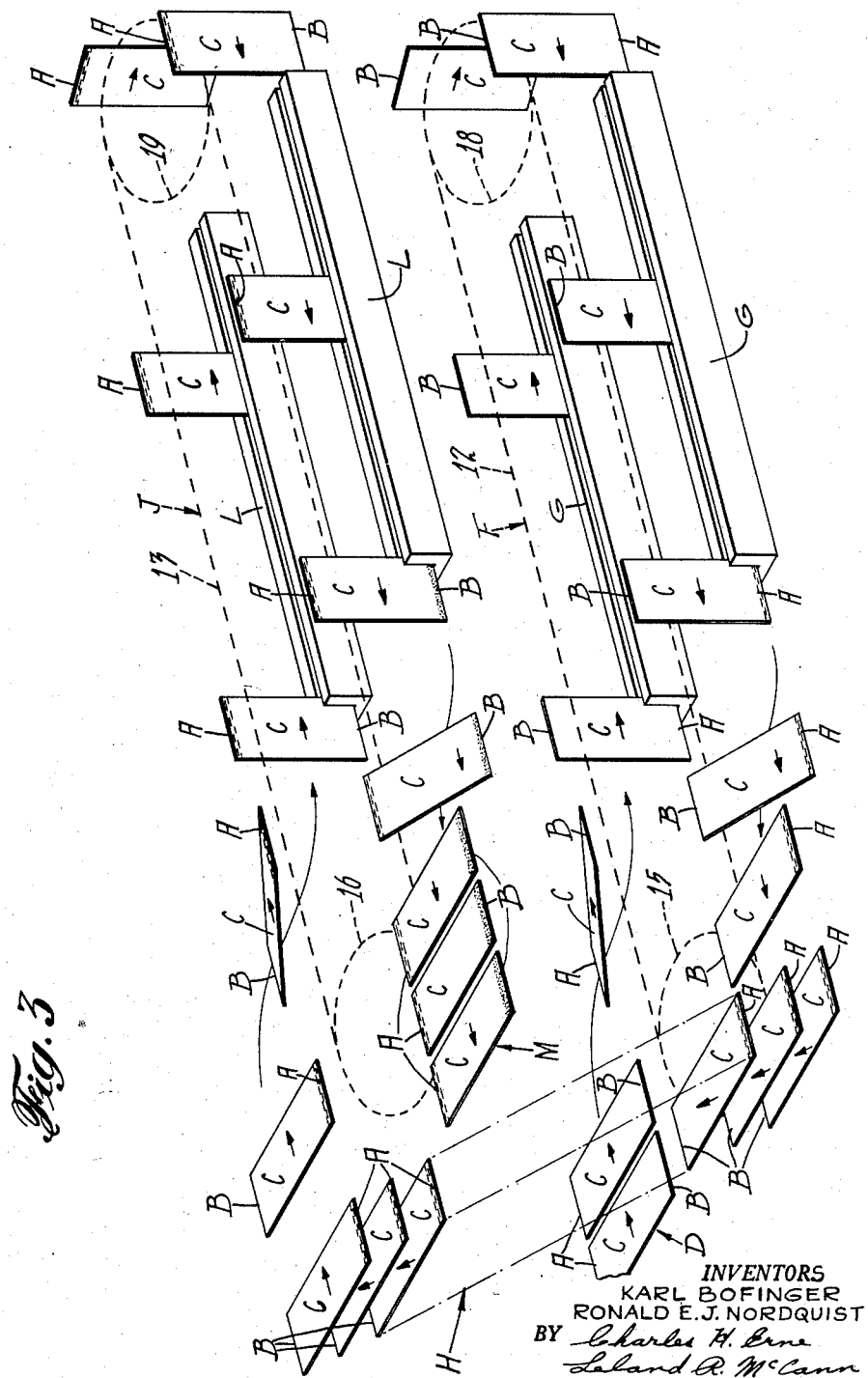
Fig. 3 is a schematic perspective view showing the path of travel of the articles advancing through the apparatus.

In the apparatus the blanks C are received from any suitable source of supply such as a stack of such blanks and are advanced through a feed-in station D (Fig. 3) in a horizontal position in spaced and timed relation with their marginal edge portions A, B free and disposed in the direction of travel of the blanks (toward the right as viewed in Fig. 3). At the feed-in station D, the marginal edge portion B of a blank C is gripped by a first operation gripper E (Figs. 1, 4, 5) carried on a conveyor F which is part of a conveyor system termed the conveyor means, and which is disposed in a horizontal plane for advancing the blank edgewise along a predetermined path of travel.

While the blank C is so gripped it is pivoted on its gripped edge portion B downwardly and inwardly, from its horizontal position into a vertically depending or suspended position with its marginal edge portion A disposed at the lower extremity of the blank and free and exposed for treatment. This pivoting of the blank C preferably is effected while the blank is moving along its path of travel with the conveyor F. During this advancement of the blank, its free and exposed marginal edge portion A, while maintained at a predetermined constant level, is advanced through one or more treating stations G which perform an operation on the blank edge portion A.

Upon leaving the last of the treating stations G, the blank C is pivoted on its upper edge portion B, outwardly and upwardly from its vertically suspended position into a horizontal position similar to its original horizontal position as shown in Fig. 3. In this horizontal position the grip on the blank edge portion B is released and the blank is swept forward into a transfer device which includes an inclined elevator conveyor H (see also Figs. 1 and 2). This transfer conveyor H carries the blank C bodily while maintaining it in a horizontal position and elevates the blank to a level above the conveyor F. At this higher level the transfer conveyor H locates the blank in the horizontal plane of a horizontally disposed second operation conveyor J (Fig. 3) which is similar to the first operation conveyor F and which is part of the conveyor means.

In the transfer of the blank C from the first operation conveyor F to the second operation conveyor J, the transfer conveyor H is arranged to reverse the location of the marginal edge portions A, B of the blank by the presentation of the treated edge portion A to the second operation conveyor J so that the untreated edge portion B is free for treatment. In the instant case, this reversal of the edge portions A, B is brought about by locating the second operation conveyor J directly above the first operation conveyor F and by actuating them in the same direction and by locating the transfer conveyor H in an inclined position between the first and second operation conveyors so that the transfer conveyor receives the blanks from one run of one conveyor and delivers them to an opposite run of the other conveyor as shown in Fig. 3.

Accordingly, when the treated edge portion A of the blank C is presented to the second operation conveyor J, it is gripped by a second operation gripper K (Fig. 1) carried on the conveyor J. With its treated edge portion A gripped, the blank C is pivoted downwardly and inwardly, as in the first operation explained above, from the horizontal transfer position to a vertically depending or suspended position with its untreated edge portion B now disposed at the lower edge of the blank and free and exposed for treatment. Treatment of the edge portion B is effected by passage through one or more treating stations L while the blank C is advanced along its path of travel and while maintained at a predetermined constant level.

Upon leaving the last of the treating stations L, the blank C, with both edge portions A, B now treated, is pivoted on its upper edge A, outwardly and upwardly, from its vertically suspended position into a horizontal position similar to that in which it was received from the transfer conveyor H. In this horizontal position the blank C is presented to a discharge station M (see also Figs. 1 and 2) preferably for discharge from the apparatus as shown in the drawings or for further advance through additional portions of the apparatus for further treatment.

Figure 1:
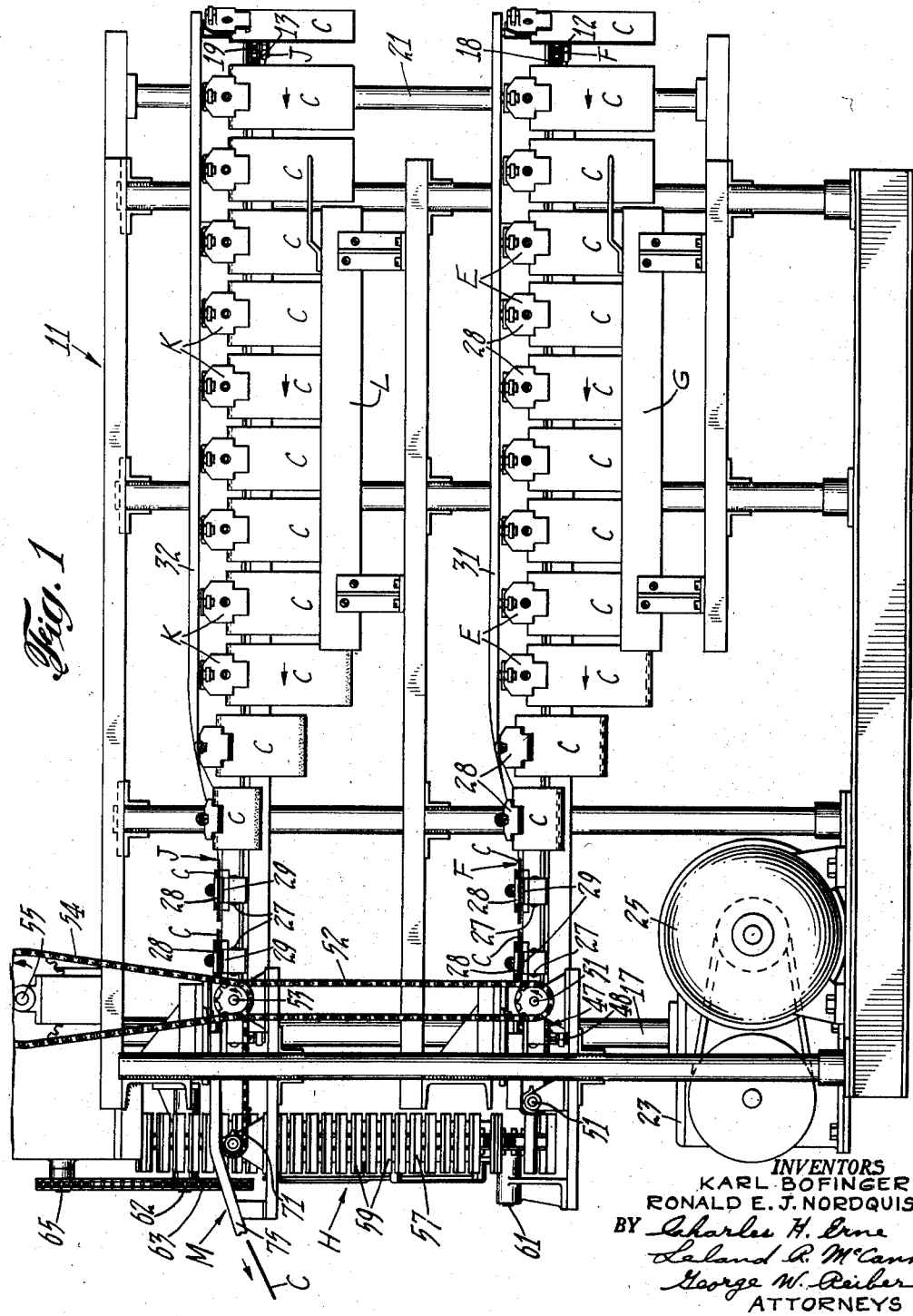
Figure 1 is a side elevation of an apparatus embodying the instant invention.
Figure 2:
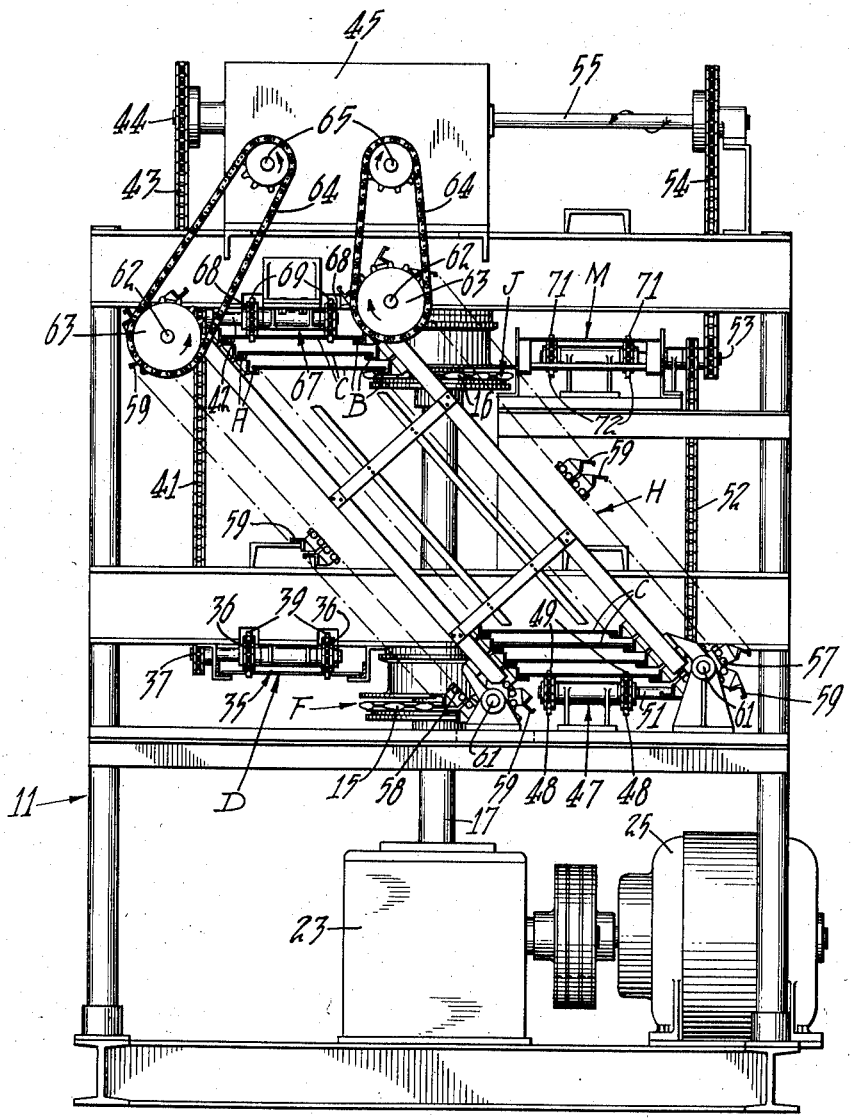
Fig. 2 is an end elevation as viewed from the left in Fig. 1.

In the apparatus illustrated in the drawings the various working parts are supported in a structural steel frame generally indicated by the numeral 11 (Figs. 1 and 2). The first and second operation conveyors F, J, preferably are endless chains 12, 13 respectively located in horizontal planes disposed one above the other in spaced relation. These chains 12, 13 operate over respective driving sprockets 15, 16 (Fig. 2) mounted in spaced relation on a vertical drive shaft 17, and over respective idler sprockets 18, 19 (Fig. 1) mounted in spaced relation on a vertical idler shaft 21. The drive and idler shafts 17, 21 are journaled in suitable bearings formed in the machine frame 11. The drive shaft 17 at its lower end is also journalled in a gear reduction unit 23 which is actuated through a pulley and belt drive connection with an electric motor 25. The motor 25 preferably is the main source of power and through suitable connection therewith actuates all of the moving parts of the machine in timed relation.

Figure 5:
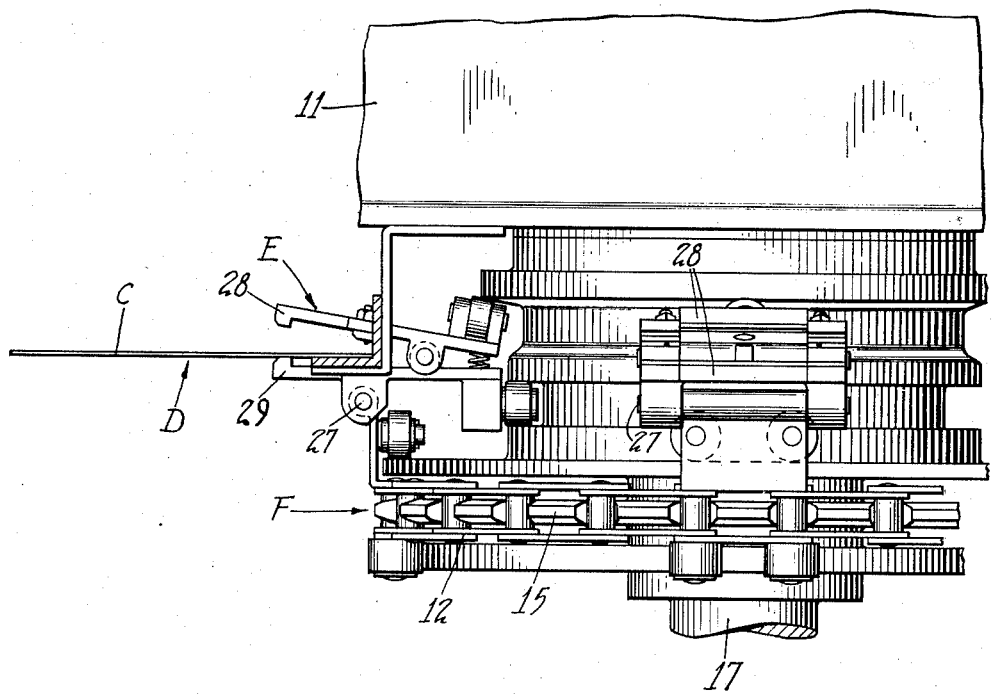
Figs. 4 and 5 are enlarged fragmentary views showing body blank gripper devices used in the apparatus, their mounting on and movements relative to a conveyor.
Figure 4:
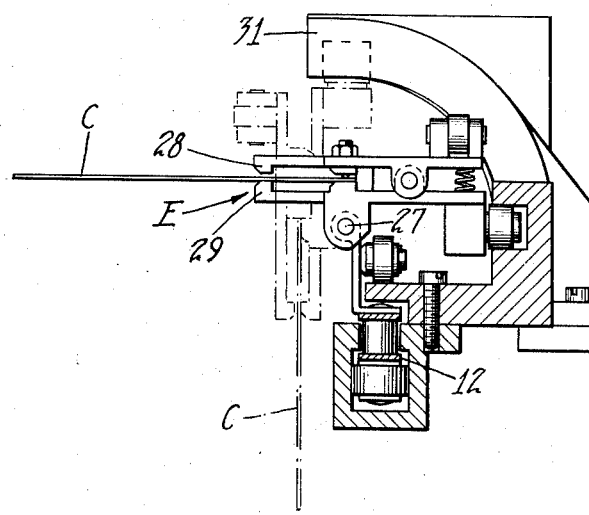

The grippers E, K carried on the respective conveyors F, J are mounted on horizontally disposed pivot pins 27 (Fig. 1) carried on the chains 12, 13 at spaced intervals along the length of the chains for travel therewith. These grippers E, J may be of any suitable construction providing a pair of normally closed spring held clamp jaws 28, 29 which are opened and closed at the proper time to grip and release the blanks C. Such a gripper is illustrated in Figs. 4 and 5 and is more specifically described in my copending application Serial No. 563,626, filed February 6, 1956. Pivoting of the grippers on their pivot pins 27 preferably is effected by the guide rails 31, 32 which are disposed adjacent the path of travel of the conveyors F, J.

The blanks C to be treated, enter the machine in spaced and timed relation in a substantially continuous procession and in a horizontal position as mentioned hereinbefore, at the feed-in station D (Figs. 2, 4 and 5) by way of a feed-in conveyor 35 (Fig. 2) which is disposed in the plane of horizontally positioned grippers E on the lowermost or first operation conveyor F (Figs. 2, 4 and 5) and located in offset relation to the run of the conveyor F, at the left as viewed in Figs. 2 and 3. The feed-in conveyor 35 preferably comprises a pair of spaced and parallel endless chains 36 which operate over sprockets mounted on shafts 37 journaled in the machine frame 11. The chains carry spaced feed dogs 39 for propelling engagement behind the blanks C. One of the shafts 37 is driven by an endless drive chain 41 (Fig. 2) which is actuated from a drive shaft 42 located in the upper portion of the machine and driven by a chain 43 from a shaft 44 of a drive unit 45 connected to the upper end of the vertical conveyor drive shaft 17.

From the feed-in station D, the feed-in conveyor 35 delivers a blank C in position adjacent the feeding run of the first operation conveyor F just beyond the conveyor drive sprocket 15, with the marginal edge portion B of the blank nearest the conveyor, in parallelism therewith and in line with one of the open grippers E on the conveyor. While traveling in this relation for a short distance the gripper closes against the edge portion B and carries the blank away from the feed-in conveyor 35. Thereafter the gripper E, under action of its guide rail 31, pivots the blank into its suspended position and carries it edgewise along the path of travel of the conveyor around the idler sprocket 18 and back along the return run (at the right as viewed in Figs. 2 and 3) of the conveyor back to the drive sprocket 15, as hereinbefore explained. It is during this travel that the edge portion B of the blank is treated as hereinbefore explained.

As the returning blank C approaches the drive sprocket 15, the gripper E, under action of the guide rail 31, pivots the blank outwardly and upwardly into its horizontal position as hereinbefore mentioned and delivers the blank in this position to a short conveyor 47 (Figs. 1 and 2). Conveyor 47 like the feed-in conveyor 35 comprises a pair of spaced and parallel chains 48 having spaced feed dogs 49 for propelling engagement behind the delivered blanks C. The chains 48 operate over pairs of spaced sprockets carried on a pair of shafts 51, one of which is connected by a driving chain 52 which is actuated from a shaft 53 in the upper portion of the machine. This shaft 53 in turn is driven by a chain 54 which is actuated by a shaft 55 extending from the drive unit 45.

The short conveyor 47 delivers the blank C directly into the inclined or angularly disposed transfer conveyor H. The transfer conveyor H is disposed adjacent the drive sprocket ends of the first and second operation conveyors F, J, and extends from the return run of the first operation conveyor F to the feeding or opposite run of the second operation conveyor J as best shown in Figs. 1 and 2. The transfer conveyor H preferably comprises a pair of spaced and parallel inclined endless chains 57, 58 having cooperating L-shaped vanes or carrying elements 59 onto which a blank C is delivered at the bottom of the transfer conveyor H directly from the short conveyor 47 and by which the blank is carried upwardly in a horizontal position to the feeding run of the upper or second operation conveyor J. The chains 57, 58 operate over cooperating spaced sprockets mounted on lower and upper sprocket shafts 61, 62 journaled in suitable bearings in the machine frame 11. The upper shafts 62 carry drive sprockets 63 which are rotated in the proper directions by endless chains 64 actuated by sprockets on a pair of shafts 65 connected to the drive unit 45.

At the top of the inclined transfer conveyor H, the blank C with its treated marginal edge portion A nearest the feeding run of the second operation conveyor J is swept out of the transfer conveyor H in a horizontal plane by a short conveyor 67 (Fig. 2) which is similar to the feed-in conveyor 35 and the short conveyor 47. This conveyor 67 is disposed at and extends transversely of the top end of the transfer conveyor H and comprises a pair of spaced and parallel endless chains 68 having spaced feed dogs 69 for propelling engagement behind the blank C. The chains 68 operate over spaced cooperating sprockets mounted on shafts one of which is the driven shaft 42 hereinbefore mentioned. These shafts are journaled in suitable bearings in the machine frame 11.

The short conveyor 67 delivers the blank C into a position adjacent the feeding run of the second operation conveyor J near the conveyor drive sprocket 16, with the treated edge portion A nearest the conveyor and in line with the open jaws 28, 29 of the second operation grippers K. While in this position the gripper jaws of the adjacent gripper K close on the treated edge portion A of the blank C and advance the blank edgewise away from the short conveyor 67. Thereafter, the gripper K, under action of its guide rail 32, pivots the blank into its suspended position and carries it edgewise along the path of travel of the conveyor around the idler sprocket 19 and back along the return run of the conveyor, to the drive sprocket 16, as hereinbefore explained. It is during this travel that the edge portion B of the blank is treated as hereinbefore explained. Both edges A and B of the blank have now been treated and the blank is thus ready for discharge or further treatment. The drawings show discharge of the blank for the sake of simplicity.

As the returning blank C approaches the drive sprocket 16, the gripper K, under action of its guide rail 32, pivots the blank outwardly and upwardly into its horizontal position as hereinbefore mentioned and delivers the blank in this position to the discharge conveyor M (Figs. 1 and 2). This discharge conveyor like the feed-in conveyor 35 comprises a pair of spaced and parallel endless chains 71 having spaced feed dogs 72 for propelling engagement behind the delivered blank. The chains 71 operate over pairs of spaced sprockets carried on a pair of shafts, one of which is the driven shaft 53 hereinbefore mentioned. These shafts are journaled in suitable bearings in the machine frame 11.

The discharge conveyor M carries the treated blank C to and delivers the blank into a discharge chute or other discharge device 75 which directs the blank to any suitable place of deposit. This completes the cycle of operation of the machine.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. An apparatus for treating opposed marginal edge portions of can body blanks, comprising in combination conveyor means for advancing a can body blank along a predetermined path of travel, treating means disposed adjacent said path of travel for treating opposed marginal edge portions of said blank, first gripper means carried on said conveyor means for gripping an upper marginal edge portion of said blank and for holding said blank in a suspended position with its lower marginal edge portion free and exposed for treatment by said treating means, second gripper means also carried on said conveyor means for gripping the treated marginal edge portion of said blank and for holding said blank in a suspended position with its remaining untreated edge portion free and exposed for treatment by said treating means, driving means for said conveyor means, and auxiliary conveyor means disposed adjacent the path of travel of said blank and between said first and second gripper means for reversing the positions of said marginal edge portions and for delivering the reversed blank to said second gripper means.

2. An apparatus of the character defined in claim 1 wherein said auxiliary conveyor means comprises conveyors disposed between said first and second gripper means for reversing the positions of said marginal edge portions while transferring each blank in a horizontal position from said first to said second gripper means.

3. An apparatus of the character defined in claim 1 wherein said conveyor means comprises two adjacent conveyors and wherein said first gripper means is carried on one of said conveyors and said second gripper means is carried on the other of said two adjacent conveyors.

4. An apparatus of the character defined in claim 3 wherein said two adjacent conveyors are disposed one above the other.

5. An apparatus of the character defined in claim 3 wherein said two adjacent conveyors are endless chains each of which are disposed in a horizontal plane.

6. An apparatus of the character defined in claim 5 wherein said chains are disposed in horizontal planes arranged one above the other.

7. An apparatus of the character defined in claim 6 wherein said auxiliary conveyor means comprises an elevator conveyor.

8. An apparatus of the character defined in claim 6 wherein said chains are driven in the same direction and said auxiliary conveyor means is an angularly disposed elevator conveyor extending from one run of one of said chains to an opposite run of the other of said chains for reversing the positions of the treated and untreated marginal edge portions of the blank for the gripping of the treated edge portions by the second gripping means.

9. An apparatus of the character defined in claim 1 wherein said first gripper means is pivotally mounted on said conveyor means and wherein means are provided to pivot said first gripper means into an angular position relative to said conveyor means for the transfer of said blank by said auxiliary conveyor means to said second gripper means.

10. An apparatus of the character defined in claim 9 wherein said auxiliary conveyor means is arranged to receive and carry said blank in a horizontal position between said first and second gripper means.

11. An apparatus of the character defined in claim 1 wherein said second gripper means is pivotally mounted on said conveyor means and wherein means are provided to pivot said second gripper means into an angular position relative to said conveyor means to receive said treated edge portion of said blank from said auxiliary conveyor means.

12. An apparatus of the character defined in claim 1 wherein there is provided feeding means to feed said blank to and from said auxiliary conveyor means.

13. An apparatus of the character defined in claim 12 wherein said conveyor means, said auxiliary conveyor means and said feeding means are actuated in timed relation.

References Cited in the file of this patent

UNITED STATES PATENTS 2,452,879    Tomkins _____ Nov. 2, 1948